June 6, 1933.  E. L. MASTERS  1,912,988
MATERIAL DISTRIBUTOR
Filed Feb. 16, 1931
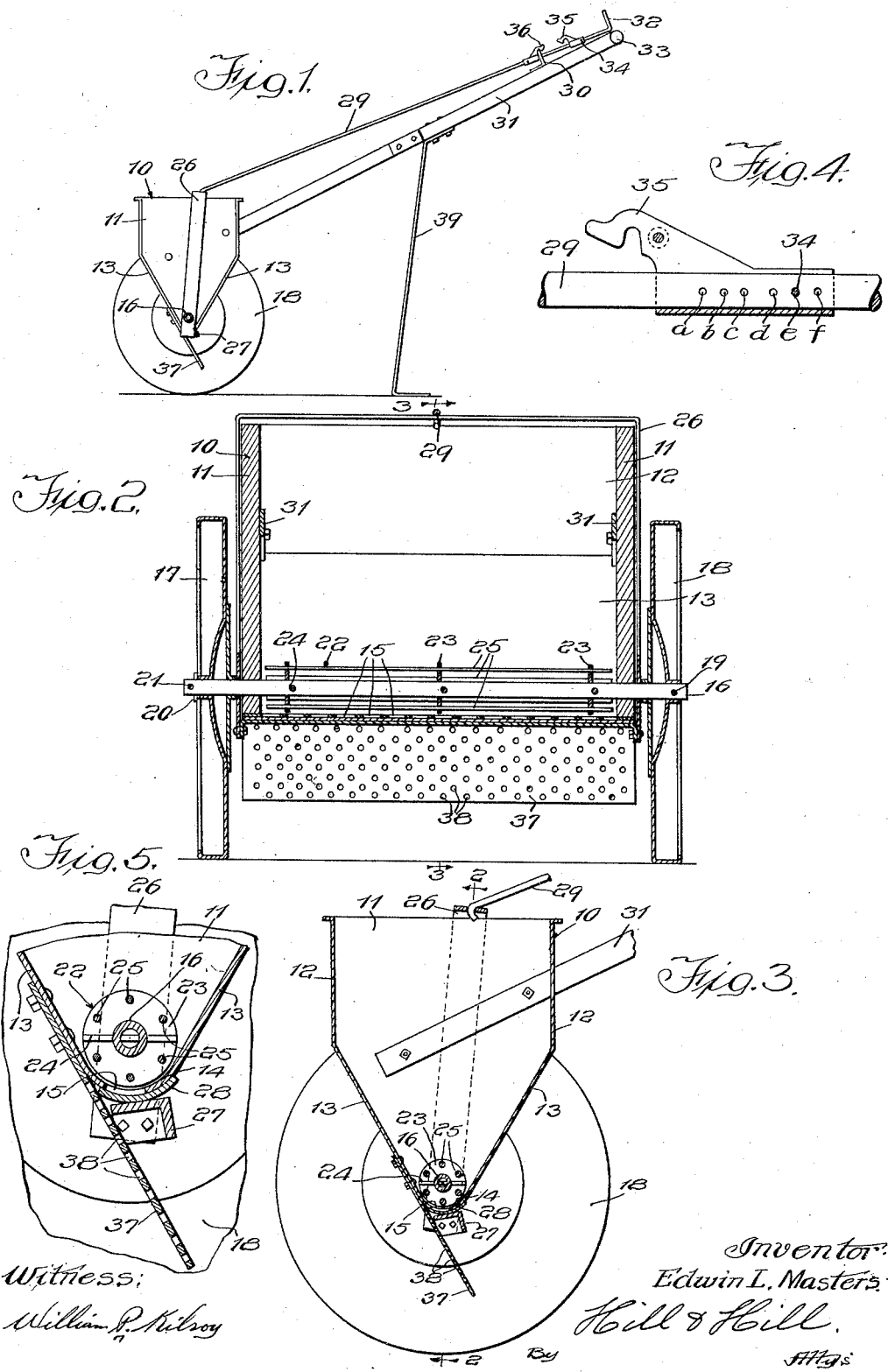
Inventor:
Edwin L. Masters
Hill & Hill
By Attys Patented June 6, 1933

1,912,988

UNITED STATES PATENT OFFICE

EDWIN L. MASTERS, OF CHICAGO, ILLINOIS

MATERIAL DISTRIBUTOR

Application filed February 16, 1931. Serial No. 516,023.

This invention relates to material distributors or spreaders, and particularly to a device of the character described which is suitably constructed for spreading or distributing various materials such as fertilizer, sand, top soil, grass seeds and the like.

The structure of the present invention is particularly adapted for spreading or distributing various materials, such as fertilizers or soils which are in finely divided powdered or granulated form, and also for sewing seeds of various kinds.

One object of the present invention is to provide a distributor which is light, durable and capable of being operated, preferably, by hand for the distribution of materials such as powdered fertilizer and seeds of various kinds on lawns, golf courses, parks and the like.

Another object of the invention is to provide a device by which substantially even or uniform distribution of the material may be obtained.

Another object of the invention is to provide means for shielding the material to be distributed from the broadcasting effect of wind currents, and to insure a substantial uniform deposit of the material on the ground.

Another object of the invention is to provide means for breaking up any lumps or oversize pieces of material which may form, or which may have formed by reason of unfavorable atmospheric conditions, thereby insuring efficient operation of the device.

A further object of the invention is to provide means for controlling the quantity of the respective materials to be deposited or spread over an area of predetermined dimensions.

A still further object of the invention is to improve devices of the character described in sundry details hereinafter refered to and particularly pointed out in the appended claims.

One embodiment of the present invention is shown for illustrative purposes in the accompanying drawing, in which:

Fig. 1 is a side elevational view of a material distributor embodying features of the present invention;

Fig. 2 is a longitudinal sectional elevation taken substantially as indicated by the line 2—2 of Fig. 3;

Fig. 3 is a transverse sectional view taken substantially as indicated by the line 3—3 of Fig. 2;

Fig. 4 is an enlarged fragmentary side view of a portion of the adjusting rod having means attached thereto for determining the quantity of material to be distributed; and Fig. 5 is an enlarged fragmentary sectional view of a portion of Fig. 3 showing the various parts of the control mechanism on a larger scale.

As shown in the illustrative embodiment, the present invention comprises a container or hopper, indicated as a whole by the numeral 10, suitably constructed for receiving the material to be distributed, such, for example, as seeds of various kinds, fertilizer preferably in powdered or granular form, sand, top soil, or other materials as may be found desirable, the said container, in the present instance, having end walls 11 of any suitable material, and side walls 12, formed preferably of sheet material and provided with inclined material-supporting portions 13 arranged in a manner to form a hopper of substantially V-shaped cross section, the extreme bottom portion 14 of the container, between the inclined portions 13, being of substantially arcuate form and provided, in the present instance, with a plurality of apertures 15 spaced longitudinally of the container, through which the material is discharged from the container.

For suitably supporting and transporting the container over the ground, a supporting axle or shaft 16 is positioned in the lower portion of the container in a manner to extend longitudinally thereof, and rotatable therein, the opposite ends of the shaft being adapted to extend beyond the ends of the container and having ground wheels 17 and 18 mounted thereon, the wheel 18 in the present arrangement being rigidly secured to the shaft 16 by means of a pin 19 for rotating the shaft 16 with the wheel 18, while the wheel 17 is permitted to rotate freely upon the opposite end of the shaft being held thereon by a washer 20 and pin 21 as clearly shown in Fig. 2.

For breaking up lumps or oversize pieces of material which may form owing to dampness or the like, and for insuring the discharge of material from the container, an agitator 21 is suitably secured, in the present instance, to the supporting shaft 16 between the end walls 11 of the container. The agitator of the illustrative embodiment comprises a plurality of discs 23 having apertures formed therein adjacent their central portions for receiving the supporting shaft 16, the discs 23 being secured by soldering, or by other suitable means, to pins 24 extending through and transversely of the shaft 16 for rotating the discs with the shaft.

Mounted in annularly spaced apertures formed in the discs 23 are a plurality of relatively thin bars or rods 25 extending longitudinally of, and substantially parallel to the shaft 16, and to each other in a manner to engage the material within the container as the shaft 16 is rotated by reason of its connection with the ground wheel 18, thus providing means for breaking up oversize pieces of material as they work down toward the bottom of the container and insuring the efficient discharge of the material from the container.

It will be observed that the diametrical distance between oppositely positioned rods 25 of the agitator is materially less than the diameter of the ground wheels 17 and 18, and that by reason of such an arrangement, the relatively small diameter of the rods 25, and the leverage obtained, the resistance of the material to the rotation of the agitator is materially reduced, thereby contributing to the ease with which the distributor may be operated or moved over the ground when in operation.

For controlling the discharge of material from the container by varying the effective area of the apertures 15, a rocker arm 26 shown in the present instance as of bail-like construction is pivotally mounted on the container, and as shown in the present instance, is mounted on the supporting shaft 16 in a manner to rock thereon, and to the lower end of the rocker arm or bail-like member 26 is connected an angle iron extending longitudinally of the container below the bottom portion thereof. Suitably mounted on the angle iron 27 is a closure member 28 which is formed transversely or in cross section, substantially concentric with the longitudinal center line of the supporting shaft 16 in a manner to conform to, and lie closely adjacent the outer arcuate surface of the bottom portion 14 of the container, and in a manner, when suitably adjusted, to cover the apertures 15, thereby preventing discharge of material from the container. Such an arrangement may be found desirable in transporting the distributor from a base of material supply to the point of distribution.

In operating the device for distributing various kinds of material, which in their nature vary considerably in granular size, it has been found desirable to vary the size or effective area of the openings or apertures 15 through which the material is discharged, and for this purpose a rod 29 is secured, adjacent one of its end portions, to the rocker arm 26 and its opposite end is adapted to extend through a bracket 30 mounted on a handle 31 by which the distributor may be operated, the extreme outer end of the rod 29 being provided with an upturned portion 32 conveniently positioned adjacent the cross bar 33 of the handle for convenient manipulation by the operator.

For predetermining the quantity of any particular kind of material to be distributed over a particular area, the rod 29 is provided with a plurality of transversely extending apertures $a$, $b$, $c$, $d$, $e$ and $f$ for receiving a cotter pin 34 by which a positioning device, shown in the present instance as a latch or hook 35 may be adjustably secured to the rod 29 according to the discharge opening desired for the particular material to be distributed, then by positioning the hook 35 over the upper edge of the bracket 30, the closure member 28 will be correspondingly positioned with respect to the apertures 15. For example, if the cotter pin 34 is positioned in the aperture $a$ and the hook member 35 positioned forwardly of the rod 29 accordingly, such an arrangement will permit the closure member 28 to be positioned with respect to the apertures 15 in a manner to provide an opening sufficient to deposit approximately one-half pound of pure grass seed per approximately two hundred to three hundred square feet of ground surface, while, if the cotter pin 34 is positioned in aperture $b$, and the hook 35 engaged with the bracket 30, the rod 29 is positioned further forward and the closure member 28 further rearwardly thereby increasing the discharge area of the apertures and permitting an increased discharge of the material from the container. For example, with the parts in the position just described, approximately two pounds of powdered commercial fertilizer may be deposited per hundred square feet or one pound of mixed grass seed may be deposited over a like area.

It will be observed from the foregoing description that various material may be deposited in various predetermined quantities over a predetermined area simply by securing the hook 35 at various positions of adjustment along the rod 29 thereby varying the effective area of the discharge openings formed in the bottom of the container.

Obviously a single elongated aperture or slot might be formed in the bottom portion 14 of the container instead of the plurality of apertures shown, and that by such an arrangement very efficient results may be obtained, the present structure, including the apertures 15, being merely illustrative and disclosing a preferred construction in the present embodiment of the invention.

Rigidly secured to the rod 29 is a hook 36, shown in the present instance as similar in structure and oppositely disposed to the hook 35, the hook 36, when positioned over the bracket 30 as shown in Fig. 1, positions the upper end of the rocker arm 26 toward the rear of the distributor, and the closure member 28 toward the front, thereby completely covering the apertures 15 to prevent discharge of material from the container when desired.

Suitably secured to the container 10, preferably adjacent the forward side thereof is an inclined plate 37 extending downwardly between the wheels 17 and 18 and below the lower portion of the container to a point adjacent the ground level, for shielding the material distributed from the broadcasting effect of the wind currents, thereby insuring a substantially uniform distribution of the material on the ground, the plate 37 being provided with a plurality of apertures 38 through which some of the material deposited may pass, while other portions of the material may be directed along the rear face of the plate and deposited from the lower edge thereof.

In addition to permitting the passage of material through the plate 37, the apertures 38 also permit the passage of air currents therethrough in a manner to break up the currents in the event that they are directed against the upper rear or receiving side of the plate 37, thereby preventing the material from being blown laterally and deposited in unequal quantities over the ground.

If desired, a stand or rest 39 may be provided for maintaining the distributor in upright position when left unattended.

It will be observed from the foregoing description that the present invention provides a novel and most efficient material distributor capable of distributing or spreading various kinds of material, and wherein the quantity of material deposited may be readily and conveniently controlled by the operator.

Obviously the present invention is not limited to the precise construction and arrangement shown and described, as the same may be variously modified. Moreover, all the features of the present invention need not be used conjointly as the same may be used to advantage in variously different combinations and sub-combinations.

Having thus described my invention, what I claim and desire to secure by Letters Patent is:

1. A material distributor comprising a container having a bottom portion, supporting means including a shaft extending longitudinally of and rotatably mounted in said container, said bottom portion being formed substantially concentric with the longitudinal center of said shaft and having a plurality of apertures formed therein, an agitator mounted on said shaft in a manner to rotate therewith and comprising a plurality of substantially parallel substantially round thin rods annularly spaced around the shaft, a rocker arm pivotally mounted on said shaft, a closure member mounted on said arm and positioned adjacent the bottom portion of the container in a manner to cover the apertures formed therein, said member being formed substantially concentric with the longitudinal center of said shaft, means operatively related to said rocker arm for varying the position of said member with respect to said apertures, said means comprising a bracket mounted in fixed position with respect to said container, a rod connected to said rocker arm and operatively related to said bracket in a manner to be guided thereby, securing means adjustably mounted on said rod and engageable with said bracket for securing said member in carious positions of adjustment with respect to said apertures, and a ground wheel operatively related to said shaft for rotating said agitator.

2. A material distributor comprising a container provided with a bottom portion having a plurality of apertures formed therein, a supporting shaft rotatably mounted in said container, an agitator mounted on said shaft in a manner to rotate therewith, a closure member movably mounted on said container adjacent said bottom portion, means for varying the position of said member with respect to said apertures, said means comprising a bracket mounted in fixed position with respect to said container, a rod operatively related to said member and to said bracket in a manner to be guided thereby, securing means mounted on said rod and engageable with said bracket for positioning said member in a manner to close said apertures, a second securing means adjustably mounted on said rod and engageable with said bracket for securing said member in various positions of adjustment with respect to said apertures, and ground wheels operatively related to said shaft for rotating said agitator.

3. A material distributor comprising a container having a bottom portion, a handle therefor, supporting means including a shaft extending longitudinally of and rotatably mounted in said container, said bottom portion being formed substantially concentric with the longitudinal center of said shaft and having a plurality of apertures formed therein, an agitator mounted on said shaft in a manner to rotate therewith and comprising a plurality of substantially parallel relatively thin rods annularly spaced around the shaft, a rocker arm pivotally mounted on the said shaft, a closure member mounted on said arm and positioned adjacent the bottom portion of the container in a manner to cover the apertures formed therein, said member being formed substantially concentric with the longitudinal center of said shaft, means for varying the position of said member with respect to said apertures, said means comprising a bracket having an aperture formed therein mounted on said handle, a rod connected to said rocker arm and extending through the aperture formed in said bracket, a hook rigidly secured to said rod at one side of said bracket and engageable with the bracket for securing said closure member in position to close the apertures formed in said bottom portion, a second hook adjustably mounted on said rod at the opposite side of said bracket and engageable with the bracket for securing said closure member in various positions of adjustment with respect to the apertures formed in said bottom portion for varying the effective area thereof, ground wheels operatively related to said shaft for rotating said agitator, and a perforated inclined apron extending downwardly from the bottom portion of said container between said ground wheels.

In witness whereof I hereunto subscribe my name this 5th day of February A. D., 1931.

EDWIN L. MASTERS.